Sept. 28, 1954 H. M. HARRISON ET AL 2,690,340

SOUND RECORDING OR REPRODUCING APPARATUS

Filed Sept. 20, 1950

INVENTORS
H. M. Harrison
J. W. Driscoll
BY Glascock Downing & Seebold
ATTORNEYS

Patented Sept. 28, 1954 2,690,340

UNITED STATES PATENT OFFICE 2,690,340

SOUND RECORDING OR REPRODUCING APPARATUS

Henry Milburn Harrison, Hanworth, and John William Driscoll, Heston, England, assignors to Electric & Musical Industries Limited, Hayes, England, a company of Great Britain Application September 20, 1950, Serial No. 185,784

Claims priority, application Great Britain September 24, 1949

9 Claims. (Cl. 274—4)

This invention relates to magnetic sound recording or reproducing apparatus.

It has been proposed to provide apparatus comprising a recording unit for recording sounds magnetically on a disc of paper or the like coated with magnetic material, and a reproducing unit for reproducing the sounds recorded in such a disc, the apparatus being particularly useful for commercial purposes for recording speech, so that the speech can be subsequently typed on reproduction thereof. Frequently a single unit is designed both for recording or reproducing. In one form of such apparatus each unit comprises a turntable for supporting the record disc, a tracking disc which can be placed on the turntable on top of the record disc thereon and so as to be in driven connection with the turntable, and a transducing head which by engagement with said tracking disc is caused when the turntable rotates to track radially with respect to the record disc on the turntable, the tracking disc being separate from the turntable since it has to be taken off each time the record disc is removed.

The object of the present invention is to provide improvements in magnetic sound recording or reproducing apparatus, such for example as that described in the preceding paragraph.

Another object of the present invention is to provide magnetic sound recording or reproducing apparatus comprising a base, a turntable for supporting a record disc rotatably mounted on said base, a tracking disc adapted to be placed on said turntable on top of said record disc, a transducing head, and means connected to said transducing head for engaging said tracking disc to cause said head to be tracked relatively to the turntable on rotation of said turntable and said tracking disc, and a single supporting arm pivotally attached to said base, and having said transducing head and said tracking member mounted thereon.

A further object of the present invention is to provide magnetic sound recording or reproducing apparatus wherein a magnetic erasing device which spans the full effective width of the turntable is mounted on the same supporting structure as a tracking disc, so that efficient erasure of an entire record can be achieved by a single rotation of the turntable for carrying the record, whilst at the same time risk of inadvertent damage to the transducing head or erasure of the record is substantially minimized.

In order that the said invention may be clearly understood and readily carried into effect, the same will now be more fully described with reference to the accompanying drawings, in which.

Figure 1:
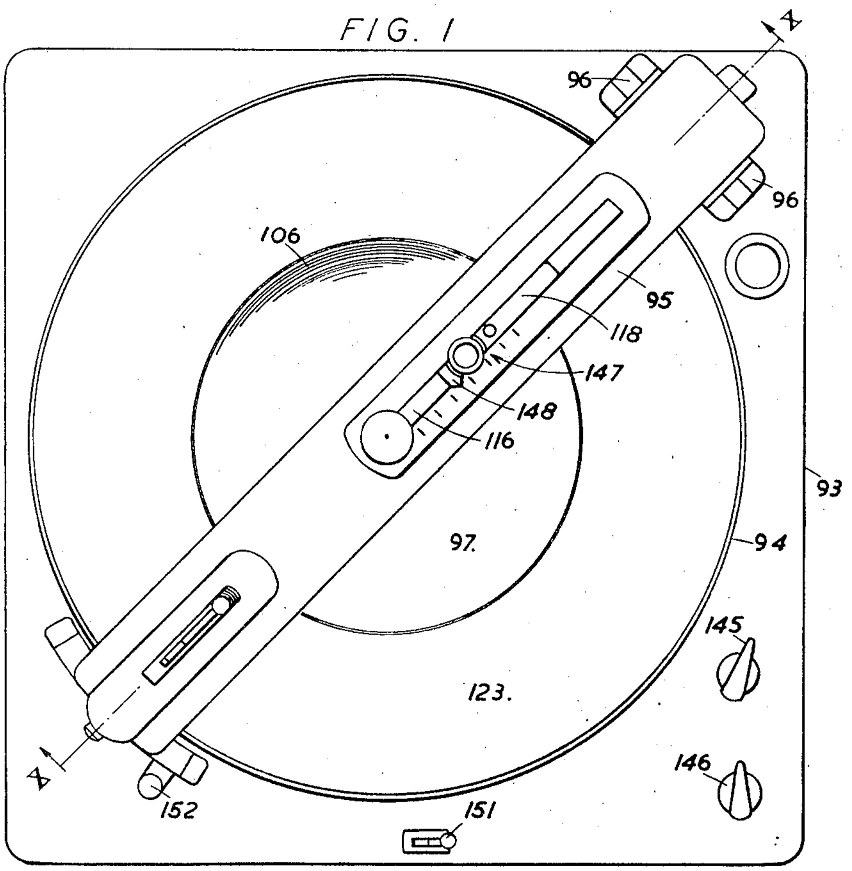
Figure 1 illustrates in plan view a form of magnetic recording and reproducing apparatus according to the present invention.

The apparatus illustrated in the drawings comprises a chassis or casing 93 which forms a supporting base and on top of which is rotatably mounted a turntable 94 driven by an electric motor housed in the casing 93. A supporting structure in the form of an arm 95 is pivoted about a horizontal axis on lugs 96 attached to the casing so that the arm can be lowered to the turntable or lifted therefrom, as desired. When lowered, the arm extends diametrically across the turntable as shown. The arm carries a tracking member 97 of disc or plate form, a tracking wheel 98 and a transducing head 99. The turntable 94 is covered by a sheet 100 of rubber or other material having a high coefficient of friction. Part of the underside of the tracking disc is also covered by a material 101 having similarly a high coefficient of friction. The tracking disc is suspended from a spindle 102 which is freely rotatable in a bush 103 on the arm 95, and when the arm is lowered to the operative position shown in Figures 1 and 2 the tracking disc is supported by the turntable, being centered accurately thereon by a stud 104 projecting from the turntable, the stud engaging a corresponding aperture in the base of the spindle 102. If a record disc, such as the disc 123, is located on the turntable, it is pressed against the turntable by the tracking disc 97. A compression spring 105 yieldably presses the tracking disc towards the turntable. A spiral groove 106, running from the outer edge to the centre of the tracking disc is formed on its upper surface in known manner.

Figures 2, 3, 4:
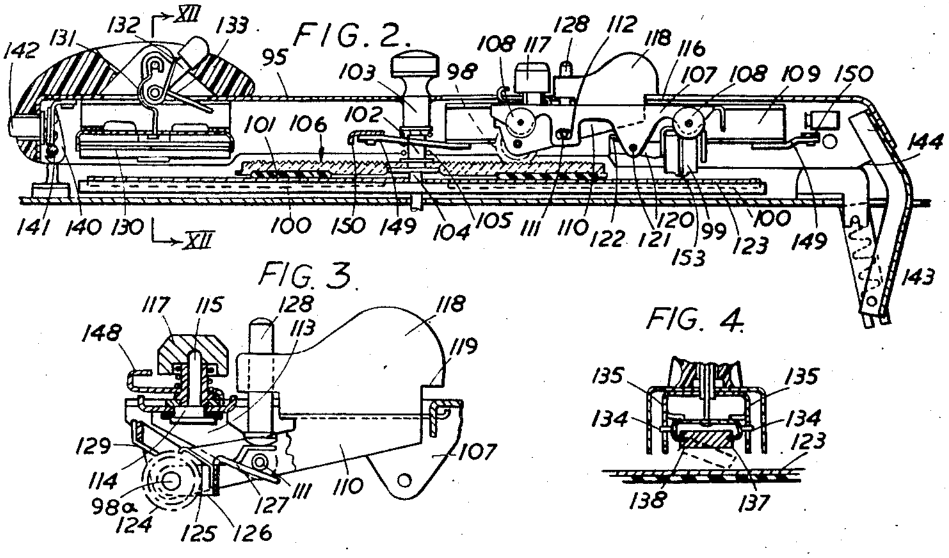
Figure 2 is a longitudinal sectional view on the line X—X of part of the apparatus shown in Figure 1.
Figure 3 is a detail view of part of Figure 2.
Figure 4 is a section on the line XII—XII of Figure 2.

The tracking wheel 98 and transducing head 99 are mounted on a carriage 107, as shown especially in Figures 2 and 3. It is fitted with wheels 108 which run in guides 109 fitted inside the arm 95 so that the carriage can travel along the arm between the bush 103 and the pivot of the arm, the arm 95 being generally of inverted U-shape in cross section. Only one of the guides 109 is visible in Figure 2. The tracking wheel 98 is secured to a shaft 98a journalled in one arm of a yoke-shaped lever 110 fulcrumed on a shaft 111 which is mounted for limited longitudinal movement in slots 112 formed in the sides of the carriage. The fulcrum of the lever can thus be displaced parallel to the direction of travel of the carriage and its position is controlled by a yoke 113 which links the shaft 111 to an eccentric 114 carried by a stud 115. The latter is journalled on the top of the carriage 107 and projects through a longitudinal slot 116 (Figure 1) on the top of the arm 95, a control knob 117 being fitted to the projecting end of the stud 115. The eccentric 114 engages a traverse slot in the yoke 113, so that by rotation of the knob 117 the shaft 111 is displaced longitudinally in the slot 112. The other arm of the lever 110 is fitted with a handle 118 which projects through the top of the carriage and the slot 116. A suitable spring (not visible) is arranged to urge the tracking wheel 98 downwards so as to cause it to engage the tracking disc when the arm 95 is in operative position, while by depressing the handle 118 the tracking wheel can be displaced out of engagement with the disc. The tracking wheel is formed with teeth of the same pitch as the spiral groove 106, so that one of the teeth can mesh with groove when the tracking wheel engages the tracking disc. The depression of the handle 118 is limited by shoulders 119 on the handle.

The transducing head 99, may be of any suitable construction, such for example as that described in the co-pending patent application, Serial No. 130,274, filed by Harrison, Driscoll and Payne on November 30, 1949. In that case the head 99 comprises a substantially rectangular magnetic core mounted with its plane transverse to the arm 95. The vertical limbs of the core have windings applied thereto in known manner, while the lower horizontal limb of the core is formed with a transverse non-magnetic gap. The head 99 is carried at one end of a lever 120 pivoted to the carriage at 121, the other arm of the lever being formed with a lug 122. When the arm 95 is lowered as shown, the weight of the head normally causes the head to drop so that the under edge of the lower horizontal limb of the core rests on a record disc, such as indicated at 123, on the turntable, and in this position of the head the lug 122 just fails to engage the lever 110. However, if the lever is depressed by means of the handle 118, engagement with the lug 122 occurs, and the head is lifted sufficiently to move it from engagement with the record disc 123. Depression of the handle 118 thus lifts both the tracking wheel 98 and the transducing head 99 so that the carriage can then by further manipulation of the handle 118 be displaced as desired along the guides 109 independently of the tracking disc 97. The slot 116 is elongated to allow sufficient travel of the carriage for the tracking wheel 98 to move from the outside edge to near the centre of the tracking disc 97, the separation between the tracking wheel and the transducing head being such that the transducing head then moves from the outer edge of the turntable to near the edge of the tracking disc. Moreover, it will now be apparent that manipulation of the knob 117 allows slight adjustment of the separation between the tracking wheel 98 and the transducing head 99 for purpose of correcting alignment of the head 99 on an existing record. The outermost position of the carriage 107 is limited by a suitable stop carried by the head.

A ratchet wheel 124 is secured to the shaft 98*a* of the tracking wheel 98. The ratchet wheel, whose teeth are of the same pitch as the teeth of the tracking wheel 98, co-operates with a pawl 125 secured to a bracket 126 which pivots on the shaft 98*a*. The bracket carries a bifurcated arm 127 which embraces the shaft 111 and is spring-loaded (the spring not being shown in the interests of clearness) against a press stud 128 which slides on a slot in the handle 118. The arm 127 is so adjusted that by depressing the stud 128, the ratchet wheel and hence the tracking wheel is rotated one tooth in the clockwise direction as seen in Figure 2. Rotation in this direction causes a backward movement of the carriage, and hence of the transducing head 99 by the distance of one pitch of the spiral groove 106. A holding detent 129 prevents rotation of the tracking disc in the opposite direction.

At the outer end of the arm 95, a permanent magnet 130 is suspended by a hook 131 from one arm of a bell-crank lever 132. A coil spring 133 normally maintains the magnet in the elevated position shown in Figures 2 and 4 in full line, in which position the magnet has no significant effect on the magnetic material of the record disc 123. The free arm of the bell-crank lever projects through the top of the arm 95 so that the lever can be manipulated and the magnet lowered. The magnet 130 extends radially over the full width of the part of the turntable 94 exposed by the tracking disc 97. The magnet also has an appreciable width and its magnetic axis is horizontal and in plane of the paper as seen in Figure 4. It is guided at the sides by studs 134 which are slidable in vertical slots 135 and 136 formed in suitable guides. The slot 135 is limited so that when, by manipulating the lever 132, the magnet is lowered, the stud in the slot 135 is arrested causing the magnet to tilt as indicated by dotted lines in Figure 4, until the right hand edge 137 (the south pole) of the magnet rests on the record disc 123, the slot 136 being open at its lower end. The magnet is provided for the purpose of erasing existing recording from such record disc as may be on the turntable, and this being effected merely by lowering the magnet (as shown in Figure 4) and rotating the turntable once. By causing the axis of the magnet 130 to become inclined as described (the edge 137 being arranged to be the forward edge) any existing magnetic signals in a record disc 123 are erased by the flux near the end 137 of the magnet, which cause saturation of the magnetic material. Thereafter, as the turntable rotates to bring the raised end 138 over the part of the record which has been erased, the flux from the magnet becomes less intense and the saturation of the magnetic material of the record disc is reduced. It has been found that if the inclination of the magnetic axis of the magnet 130 is arranged to be about 30° to the horizontal the record disc is ultimately rendered almost neutral magnetically and the noise level in the subsequent recordings is substantially reduced.

A further hook 140 is carried at the forward end of the arm, and a bar 141 is fitted on the top of the casing 93 in such a position that the hook 140 automatically hooks under the bar when the arm 93 is lowered to the operative position, locking the arm at the correct height above the turntable. The bar 141 thus functions as a rest on which the arm 93 is supported when the arm is lowered to its operative position. A press button 142 is provided for releasing the hook 140 when it is desired to raise the arm 95. Toggle mechanism, indicated generally at 143 is connected to the arm at its pivoted end to control the raising and lowering movements of the arm. The angle to which the arm can be raised is limited by the inclined edge 144, the angle being arranged to be just sufficient (about 30°) to enable a record to be easily placed on or removed from the turntable.

It is believed that the operation of the apparatus will be readily understood. The electrical circuits of the apparatus may be the same as described in the specification of the aforesaid co-pending patent application. A two position knob 145 is provided and by manipulating the knob to one or other of these positions, the apparatus can be conditioned for recording or reproduction as desired. When conditioned for recording, electrical signals representative of speech, applied to the apparatus by means of a suitable microphone, are amplified and fed to the windings applied to the core 153 of the transducing head. The electrical signals are thus translated into magnetic signals suitable for recording on the record disc 123 on rotation of the turntable, in well known manner. When the apparatus is conditioned for reproduction, electrical signals picked up from an existing magnetic record on a disc 123 by the winding on the core 153 are fed to an amplifier and then to a loudspeaker mounted in the casing 93. Numeral 146 denotes a volume control knob which can be employed for volume control when the apparatus is conditioned for reproduction. A suitable time scale 147 is marked on top of the arm 93 to co-operate with an index member 148 secured to the carriage 107, to indicate the amount of recording time remaining on a particular record disc during recording. During recording and reproduction back-spacing for re-hearing purposes can be effected by the press stud 115. The apparatus shown is especially applicable to portable arrangements.

The guides 109 are secured to the arm 93 by strips 149 which are screwed to lateral bridge members 150 inside the arm 93. Merely by releasing these screws it is possible to remove the guides 109 and the carriage 107 from the underside of the arm 93 without difficulty. Reference numeral 151 denotes the master switch of the apparatus and numeral 152 denotes the brake lever and spaced regulator.

What we claim is:

1. Magnetic sound recording or reproducing apparatus comprising a casing, a turntable for supporting a magnetic record disc rotatably mounted on said casing, a supporting arm pivoted on said casing for angular displacement in a plane normal to the plane of a turntable, a tracking disc mounted for free rotation on said arm and having a spiral track, a fixed guide railway on said arm, a carriage having rollers on said railway whereby said carriage is mounted on said arm for displacement with respect to said tracking disc, an electro-magnetic transducing head carried by said carriage, and a detent on said carriage normally engaging said track on the tracking member, said arm being mounted on the casing for pivotation from one position in which said tracking disc is supported by said turntable coaxially therewith and with said head positioned to engage a record disc on said turntable, to another position in which said tracking disc and head are removed from said turntable to permit a record disc to be placed on or removed from said turntable.

2. Magnetic sound recording or reproducing apparatus comprising a base structure, a turntable for supporting a magnetic record disk mounted on said base structure with the turntable rotatable about a vertical axis, a supporting arm, a stationary horizontal pivot for said arm on said base structure, a tracking disc having a spiral track on an upper surface and having a lower surface adapted for frictional driving engagement with a record disc on said turntable, said tracking disc being mounted for free rotation on said arm about the axis of the tracking disc and said arm being displaceable about said horizontal pivot from a lowered position with said tracking disc supported in operative position by said turntable to an elevated position with said tracking disc above the turntable for placement of a record disc on said turntable, a magnetic transducing head guided on said arm for displacement relative to said arm, and follower means normally engaging the track on said tracking disc, said transducing head and said follower means being connected for concomitant displacement to cause said head to be tracked on rotation of said tracking disc.

3. Magnetic sound recording or reproducing apparatus comprising a base structure, a turntable for supporting a record disc rotatably mounted on said base structure, a supporting arm pivotally attached to said apparatus, a tracking member having a spiral track thereon rotatable on said arm, a carriage supported by said arm and guided for displacement thereon, a first lever fulcrummed on said carriage, an electromagnetic transducing head attached to one end of said lever, a second lever fulcrumed on said carriage, follower means attached to one end of said second lever normally engaging said track, said arm being pivotal from one position with said tracking member supported by said turntable for rotation therewith and with said head depending to engage a record disc on said turntable to another position with the tracking member and head removed from the turntable, and manually actuatable means for simultaneously depressing the other ends of said levers to lift said head and to disengage said follower means from said track.

4. Sound recording or reproducing apparatus according to claim 3, comprising manually actuatable means on said carriage for displacing one lever fulcrum with respect to the other to adjust the spacing of said head from said follower member.

5. Magnetic sound recording or reproducing apparatus comprising a base structure, a turntable for supporting a record disc rotatably mounted on said base structure, a supporting arm, a tracking disc having a spiral track thereon and mounted on said arm for free rotation about the axis of said tracking disc and for limited movement with respect to said arm along said axis, said arm being pivoted to said base structure for pivotation in a plane normal to the plane of said turntable to move the tracking disc from an operative position supported by said turntable and coaxial therewith to an inoperative position above said turntable, a rest mounted on said base for supporting said arm over the turntable in the operative position of said tracking disc, resilient means on said arm for pressing said tracking disc in the direction of its axis to produce frictional coupling with said turntable in the operative position of said tracking disc, a carriage guided for displacement on said arm, a first lever fulcrumed on said carriage, an electro-magnetic transducing head attached to one end of said lever, a second lever fulcrumed on said carriage, follower means attached to one end of said second lever and normally engaging said track, a manually actuatable means for simultaneously depressing the other ends of said levers to lift said head and disengage said follower means from said track, whereby said carriage can be displaced independently of said tracking member.

6. Magnetic sound recording or reproducing apparatus comprising a base structure, a turntable for supporting a magnetic record disc mounted on said base structure with the turntable rotatable about a vertical axis, a supporting arm, a stationary horizontal pivot for said arm on said base structure, a tracking disc having a spiral track on an upper surface, mounted for free rotation on said arm about the axis of the tracking disc, said arm being displaceable about said horizontal pivot from a lowered position with said tracking disc supported in operative position by said turntable for rotation coaxially therewith to an elevated position with said tracking disc above the turntable for placement of a record disc on said turntable, a magnetic transducing head guided on said arm for displacement relative to said arm, and follower means normally engaging the track on said tracking disc, said transducing head and said follower means being connected for concomitant displacement to cause said head to be tracked on rotation of said tracking disc.

7. Magnetic sound recording or reproducing apparatus comprising a base structure, a turntable rotatably mounted on said structure for supporting a magnetic record disc, a supporting arm pivotally mounted on said base structure, a tracking disc of smaller diameter than said turntable mounted for free rotation on said arm, said tracking disc having a spiral track formed on an upper surface, said arm being pivotal from one position projecting over the turntable at least to the center thereof with said tracking disc supported by said turntable for rotation coaxially therewith to another position with the tracking disc removed from the turntable, an electromagnetic transducing head guided on said arm for displacement relative to said arm, means for engaging said spiral track and connected to said head for displacing said head in response to rotation of said tracking disc, a magnetic erasing device carried by said arm spaced from said head and dimensioned to span the effective width of the turntable from the edge of the tracking disc (in said first position of said arm) to the edge of said turntable, and means for rendering said erasing device selectively operative and inoperative.

8. Magnetic sound recording or reproducing apparatus comprising a base structure, a turntable rotatably mounted on said base structure for supporting a magnetic record disc, a supporting arm pivotally mounted on said base structure, a tracking disc of smaller diameter than said turntable mounted for free rotation on said arm, said tracking disc having a spiral track formed on an upper surface, said arm being pivotal from one position projecting over the turntable at least to the center thereof with said tracking disc supported by said turntable for rotation coaxially therewith to another position with the tracking disc removed from the turntable, an electromagnetic transducing head guided for displacement over the effective width of the turntable from the edge of the tracking disc (in said first position of said arm) to the edge of the turntable, means for engaging said spiral track and connected to said head for displacing said head in response to rotation of said tracking disc, a magnetic erasing device carried by said arm and dimensioned to span said effective width of the turntable, and means for rendering said erasing device selectively operative and inoperative.

9. Magnetic sound recording or reproducing apparatus comprising a base structure, a turntable for supporting a magnetic record disc mounted on said base structure with the turntable rotatable about a vertical axis, a supporting arm, a stationary horizontal pivot for said arm on said base structure, a tracking disc of smaller diameter than said turntable and having a spiral track on an upper surface, said tracking disc being mounted for free rotation about the axis of the tracking disc, said arm being displaceable about said horizontal pivot from a lowered position with said tracking disc supported on said turntable for rotation coaxially therewith to an elevated position with said tracking disc above said turntable for placement of a record disc on said turntable and said arm being of a length to extend in the lowered position wholly across said turntable, a transducing head guided on said arm at one side of said tracking disc for displacement relative to said arm, follower means normally engaging the track of said tracking disc and connected to said head to cause said head to be tracked on rotation of said tracking disc, a magnetic erasing device carried by said arm at the other side of said tracking disc from said head, said erasing device being dimensioned to span the effective width of the turntable from the edge of the tracking disc (in the lowered position of said arm) to the edge of said turntable, and means for rendering said erasing device selectively operative and inoperative.

References Cited in the file of this patent

UNITED STATES PATENTS

| Number | Name | Date |
|---|---|---|
| 893,277 | Stuart | July 14, 1908 |
| 1,027,350 | Mikorey | May 21, 1912 |
| 2,005,074 | Brown | June 18, 1935 |
| 2,254,839 | Conrad | Sept. 2, 1941 |
| 2,262,732 | Gruber | Nov. 11, 1941 |
| 2,416,135 | Appleby | Feb. 18, 1947 |
| 2,535,495 | James | Dec. 26, 1950 |
| 2,535,498 | Kornei | Dec. 26, 1950 |
| 2,567,092 | Williams | Sept. 4, 1951 |
| 2,589,035 | Begun | Mar. 11, 1952 |